(No Model.)  5 Sheets—Sheet 1.

E. C. ELLWOOD.
COMBINED CULTIVATOR AND VEGETABLE PULLER.

No. 304,305.  Patented Sept. 2, 1884.

Witnesses
Wm. A. Jones,
A. B. Fairchild

Inventor,
Everett C. Ellwood
By A. M. Wooster
atty.

(No Model.)

5 Sheets—Sheet 3.

E. C. ELLWOOD.

COMBINED CULTIVATOR AND VEGETABLE PULLER.

No. 304,305. Patented Sept. 2, 1884.

(No Model.)  5 Sheets—Sheet 4.
E. C. ELLWOOD.
COMBINED CULTIVATOR AND VEGETABLE PULLER.
No. 304,305.  Patented Sept. 2, 1884.
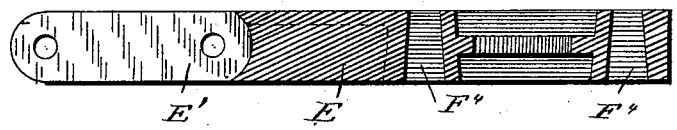
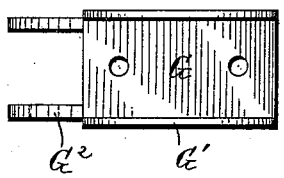
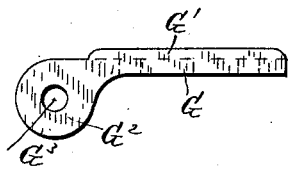
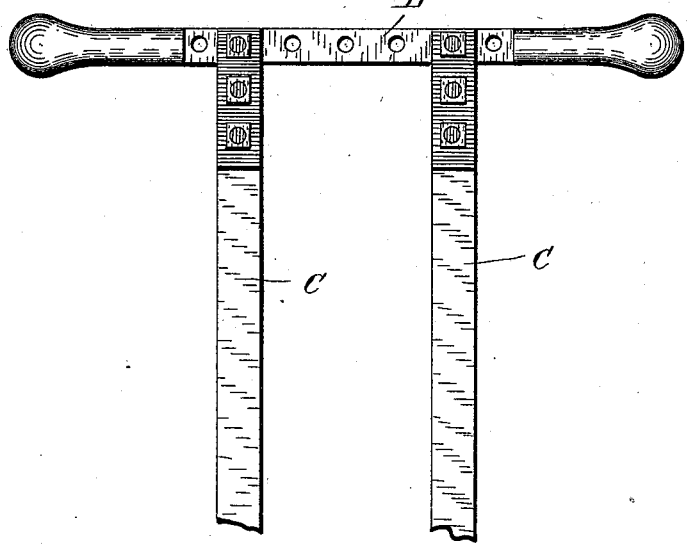
Witnesses
Wm H Jones
A B Fairchild
Inventor
Everett C. Ellwood
By F M Wooster
atty.

(No Model.) 5 Sheets—Sheet 5.
E. C. ELLWOOD.
COMBINED CULTIVATOR AND VEGETABLE PULLER.
No. 304,305. Patented Sept. 2, 1884.

Witnesses
W. H. Jones
A. B. Fairchild

Inventor
Everett C. Ellwood
By A. M. Wooster
atty.

UNITED STATES PATENT OFFICE.

EVERETT C. ELLWOOD, OF GREEN'S FARMS, CONNECTICUT.

COMBINED CULTIVATOR AND VEGETABLE-PULLER.

SPECIFICATION forming part of Letters Patent No. 304,305, dated September 2, 1884.

Application filed May 7, 1884. (No model.)

*To all whom it may concern:*

Be it known that I, EVERETT C. ELLWOOD, a citizen of the United States, residing at Green's Farms, in the county of Fairfield and State of Connecticut, have invented certain new and useful Improvements in Combined Cultivators and Vegetable-Pullers; and I do hereby declare the following to be a full, clear, and exact description of the invention, such as will enable others skilled in the art to which it appertains to make and use the same.

The object of my invention is to provide a hand cultivating implement which may be so adjusted as to loosen the soil on both sides of a row of plants at the same time, or on one side of two rows at the same time, and which, by the removal of certain parts and the attachment of others, may be made to serve as a vegetable-puller. By using a cultivator which operates on both sides of a row at the same time the operator can work much closer to the plants than when he is cutting the soil on one side of two rows, as in the former instance he has to watch but one row of plants. The time, however, during which a cultivator of this class can be used is short, as the plants soon grow to such size that a cultivator of this class must be laid aside and one used which passes between the rows, stirring the soil from row to row. By my improved construction I am enabled to readily vary the adjustment of a cultivator so that it may be used in either position with equally good results—that is to say, I can so adjust it as to cut or stir the soil close to a row of plants on both sides at the same time, or to cut or stir all of the surface between two adjacent rows; and when the season of cultivation has passed, by means of a simple attachment the same machine may be used for the purpose of removing certain classes of vegetables from the soil.

Figure 1:
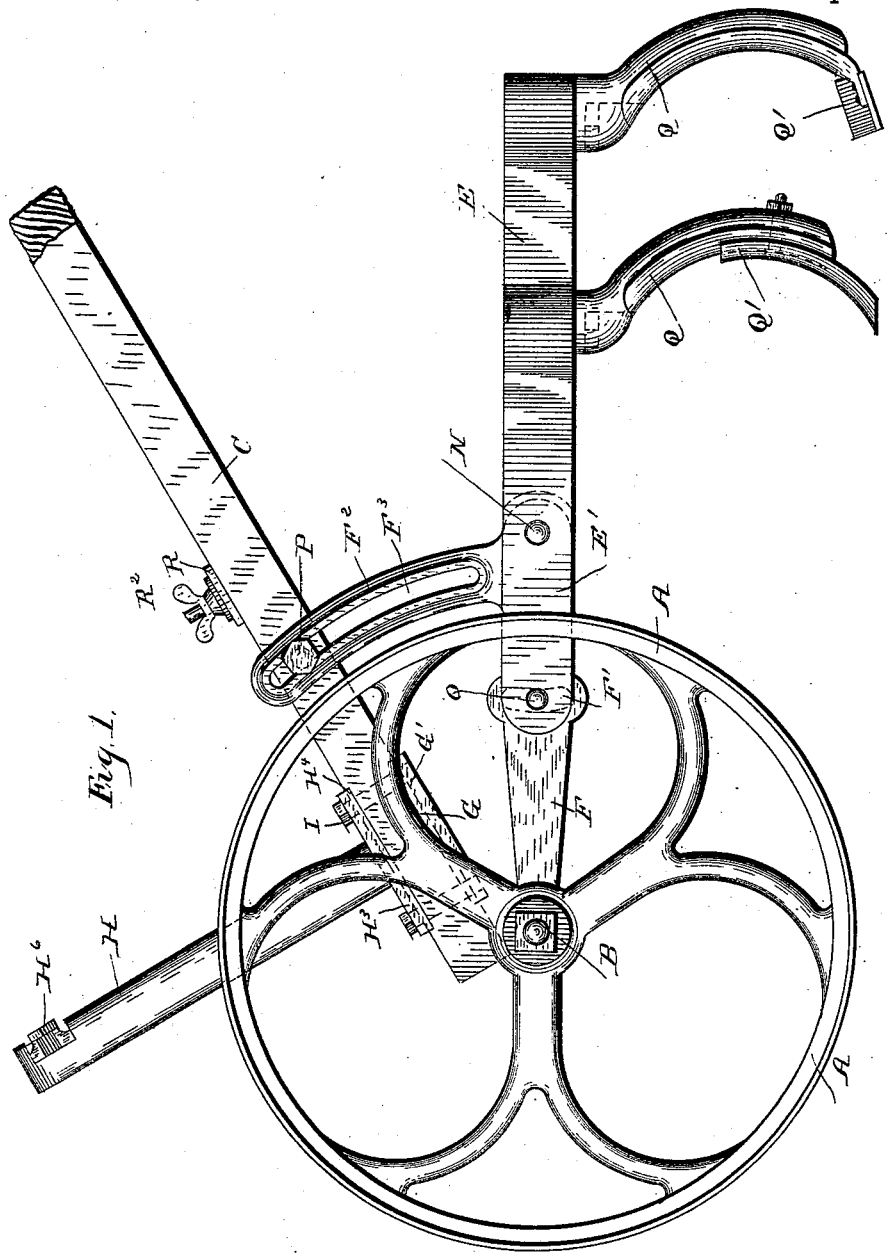
Figure 2:
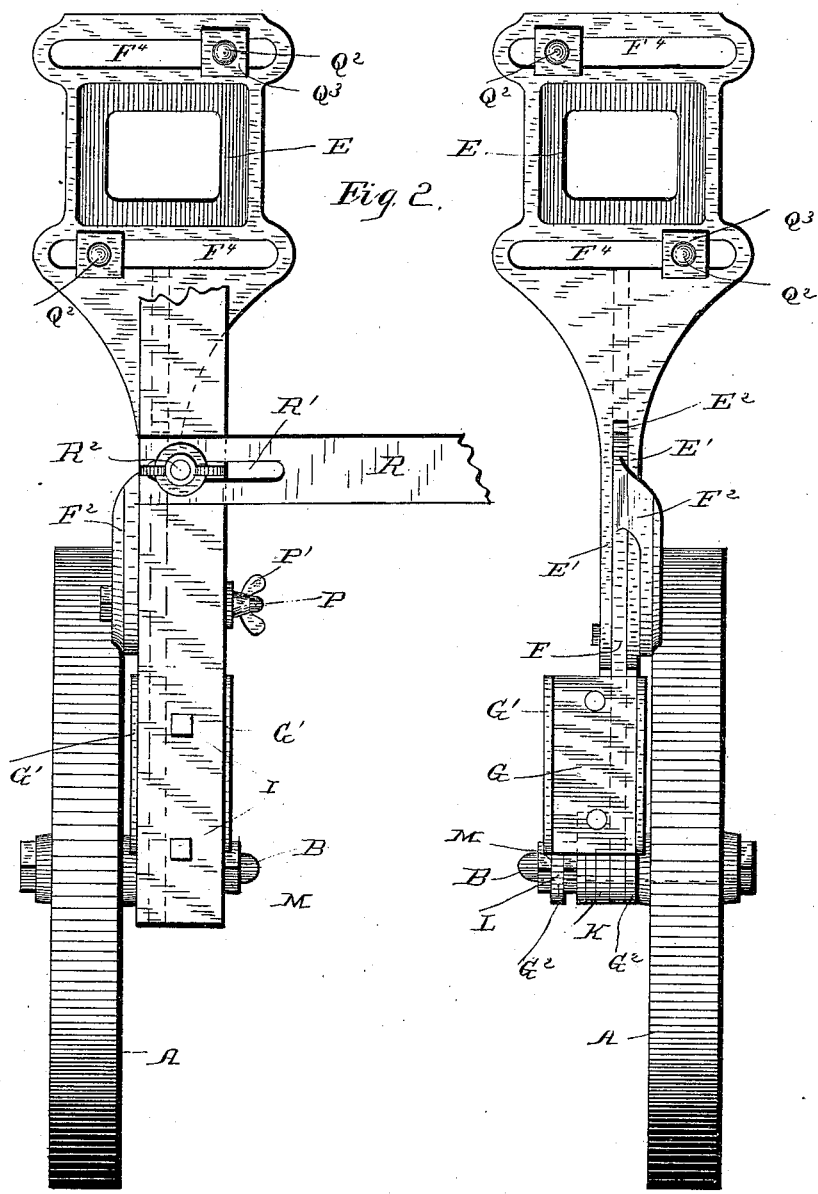
Figure 3:
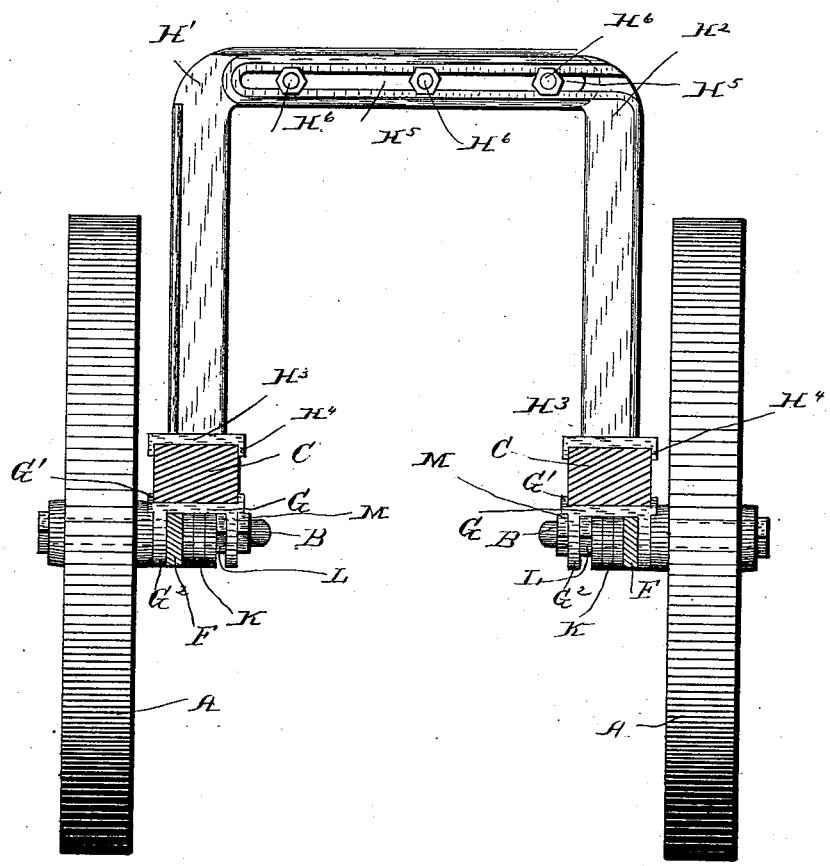
Figure 8:
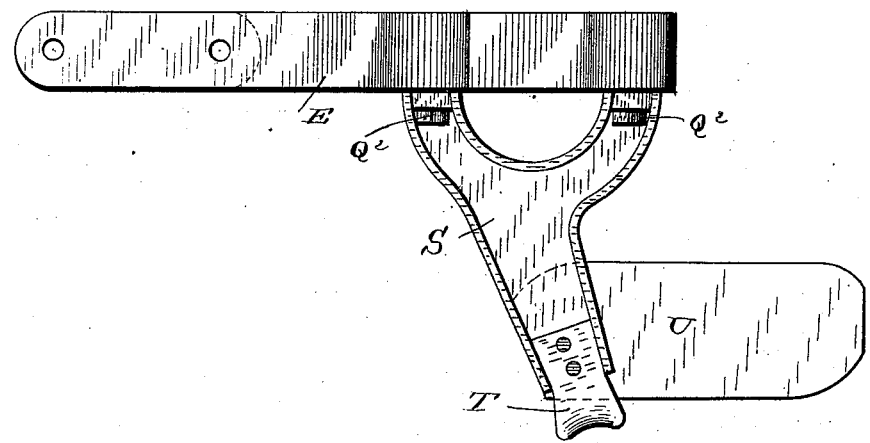
Figure 9:
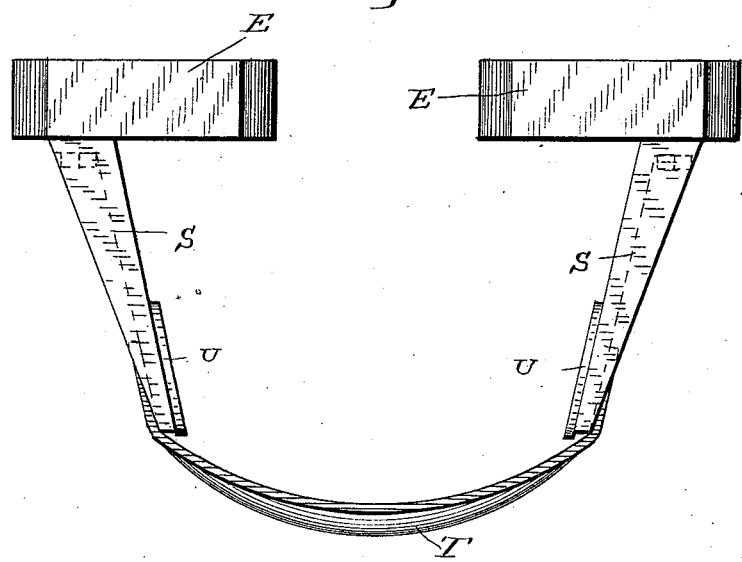

In the accompanying drawings, forming part of this specification, Figure 1 is a side elevation; Fig. 2, a plan view with the bridge and one of the handle-bars removed; Fig. 3, a rear elevation, with the handle-bars in section, in a lowered position; Fig. 4, a longitudinal section of one of the platforms. Figs. 5 and 6 are respectively top and side views of the flanged plates to which the bridge and handle-bars are secured; Fig. 7, a plan view of the handle, showing the handle-bars adjustably pivoted thereto; and Figs. 8 and 9, respectively side and rear elevations of the platforms, showing the vegetable-puller attached thereto.

Similar letters indicate like parts in all the figures.

A represents the wheels; B, the axles; C, the handle-bars; D, the handle; E, the platforms; F, the side bars; G, plates having flanges G' and ears $G^2$, and H, the bridge made in two parts, H' $H^2$, each having plates $H^3$ at the base thereof. The forward ends of the handle-bars extend down to and over the axles and rest upon plates G, being held against lateral motion by flanges G'. Plates $H^3$ are cast integral with parts H' $H^2$ of the bridge, and are provided with flanges $H^4$ similar to flanges G'. Plates G are provided with ears $G^2$, having holes $G^3$, through which the axles pass, as clearly shown.

In putting the machine together plates G and $H^3$ are so placed as to register with each other, and bolts I are passed through both plates, and through the handle-bars between them, the latter being firmly held against lateral movement by the flanges G' and $H^4$ at the bottom and top thereof. Bolts I are thus made to hold both the bridge and the handle-bars firmly in place upon plates G, through which the axles pass. The heads of the axles are upon the outer side. Between the ears $G^2$ the axles pass through the forward ends of the side bars, which are held in proper place by washers K upon the axles. The heads of the axles are prevented from being drawn too tight against the hubs of the wheels by jam-nuts L, which bear against the inner sides of the inner ears.

M is the ordinary tightening-nut, which bears against the outer sides of the inner ears. The side bars, F, extend backward in a horizontal plane from the axles, the rear ends of the side bars passing into slots $E^2$ of arms E', which extend forward from the platforms E, the side bars being pivoted in said slots by bolts N. (See Fig. 1.) It will of course be obvious that if preferred the side bars may be slotted and arms E' pivoted within the slot, instead of the arms being slotted, as at present. A short distance forward of bolts N the side bars are provided with curved slots F', through which bolts O pass. By means of these bolts and curved slots I am able to adjust the planes of the platforms for a purpose presently to be explained.

$F^2$ are arms projecting upward from the side bars near their rear ends. These arms are curved outward and forward, and are provided with correspondingly-curved slots $F^3$, as shown in Figs. 1 and 2. A bolt, P, passes through the handle-bars and through slot $F^3$. A thumb-nut, P', upon the inner side of the handle-bar acts to draw the head of the bolt against arm $F^2$, to hold the handle-bars at any desired adjustment. By simply loosening the thumb-nut the handle-bars may be raised or lowered to suit the height of the operator. The standards Q, to which the cultivator teeth or hoes Q' are attached, are adjustably secured to the platforms by means of bolts $Q^2$, which pass through transverse slots $F^4$, where they are secured at any desired adjustment by nuts $Q^3$. To change the adjustment of any of the teeth or hoes relatively to a row or rows of plants, it is merely necessary to loosen nuts $Q^3$, adjust the standards, and then tighten up again. By means of bolts O through the curved slots in the side bars I am enabled to adjust the platforms which carry the standards, so as to set the teeth or hoes at different angles, thus controlling the depth to which they enter the soil. When the soil is hard or baked, the teeth are of course set at a sharper pitch than when it is mellow—that is to say, the rear of the platforms are raised, thus causing the points of the teeth to enter the ground more nearly at a right angle to the surface. The downward pressure required to force the teeth or hoes into the soil may be exerted through the handle-bars and curved arms $F^2$.

The construction which I have shown is equally adapted to any of the ordinary well-known styles of cultivator-teeth. It is frequently necessary to change teeth, as different kinds of plants require different cultivation. The feature of adjusting the pitch of the teeth or hoes is an important one, as the blades wear away in use, which causes them to lie flatter on the surface, the handles dropping as the blades wear away. The result is that with ordinary cultivators when the blades become partially worn away it is impossible to make the teeth take hold in hard soil, thus necessitating a new set of teeth. By my improvement this trouble is wholly avoided, and I am able to use the hoes in any kind of soil until they are entirely worn out.

The two handle-bars are connected together at their lower ends by bridge H. This bridge is made in two pieces, H' $H^2$, which are provided at their lower ends with plates $H^3$, having flanges $H^4$, which bear against the sides of the handle-bars and act to steady the bridge. Bolts I, which pass through plates G and $H^3$, hold the parts of the bridge firmly in place. Both parts of the bridge extend upward from the handle-bars a sufficient distance to clear the tops of the plants, then inward at right angles to the upright part. The horizontal portion of both parts is provided with a slot, $H^5$, through which two or more bolts, $H^6$, pass to hold the two parts rigidly together. To adjust the wheels near to or farther from each other it is merely necessary to loosen the nuts upon bolts $H^6$. As shown in the drawings, the machine is arranged to operate on opposite sides of a row.

R is a cross-bar slotted near its ends, as at R', which extends across from one to the other of the handle-bars, and acts to give strength and rigidity to the device. Bolts $R^2$, having thumb-nuts, fasten the cross-bar rigidly but adjustably to the handle-bars. Handle D is adjustably bolted to the handle-bars, as shown in Fig. 7. Instead of a series of holes, as shown in the drawings, handle D may have a slot, through which the bolts pass, so as to enable the handle-bars to be brought close together and secured there.

By constructing the bridge, cross-bar, and handle in such a manner that the wheels, platforms, &c., may be adjusted relatively to each other, I am enabled, by placing the two sides of the cultivator (that is, the two wheels, platforms, &c.,) close together, to so change the cultivator as to adapt it in a moment's time to travel between two rows and cut the entire surface, instead of passing over a row and cutting the earth on opposite sides thereof. When the plants are small and the machine is adjusted to stir the soil on both sides of a row, the hoes are set in such a manner as to turn the soil away from the plants; but after the plants are well grown the hoes are set to turn the soil toward the plants. The construction I have shown, owing to its adjustability, is peculiarly adapted for still another use—*i. e.*, removing vegetables, such as onions, beets, turnips, radishes, &c., from the ground. In vegetables of this class, when grown, the bulb is partially out of ground and the roots are very slender.

As it is a frequent custom with gardeners to sow one crop between another, and the rows are seldom twice at the same distance apart, it is absolutely necessary that the wheels be adjustable toward or from each other, so as to cause them to run between the rows. Otherwise, if one of the wheels ran on a row the machine would be tilted and would work imperfectly, if at all. By making the bridge, cross-bar, and handle adjustable I am enabled to set the machine in a moment's time, so that it will just straddle a row, so that if used as a puller every vegetable in it is sure to be drawn out; or if used as a cultivator the teeth or hoes are brought as close to the row on each side as may be desirable.

When the machine is to be used as a vegetable-puller, the standards Q, which carry the cultivator teeth or hoes, are removed, and instead the arms S of the puller are bolted to the platforms through transverse slots $F^4$. (See Fig. 9.) The puller consists of a peculiarly-shaped curved blade, T, which is rigidly bolted or otherwise secured to the arms. The shape of the puller-blade is clearly illustrated in Figs. 8 and 9. From arm to arm—that is, across the machine from side to side—the blade curves downward, then upward, being lowest in the center, while transversely it curves upward, then downward, being highest in the center. The arms S are set at such an angle that when attached the front of the blade will be considerably lower than the rear. This convexity of the blade and the pitch of the front edge thereof are details of construction which I have found of considerable importance, the effect being to crowd the bulbs upward and out of the ground without cutting them in the slightest. The rear of the blade being also curved downward the bulbs roll over the blade and are left upon the surface. As the blade is attached at both ends, it is perfectly rigid, and is consequently not liable to break and cannot get out of repair.

It will of course be understood that the angle of the puller-blade is subject to adjustment, the same as the teeth or hoes, when used as a cultivator—that is, by loosening the nut on bolt O and raising or lowering the platforms. This adjustability of the blade is a very important feature, for the reason that if it stands too flat its forward edge cuts the bulbs. On the other hand, if set at too great a pitch, it crowds them together and carries them along, instead of lifting them out and dropping them. The proper adjustment may readily be determined after a moment's trial.

U represents a pair of guards, which are preferably attached to the arms. After passing over the blade the bulbs drop in between the guards, which prevent them from rolling away. The guards will be found particularly useful when the machine is used in hilly ground, as they prevent the bulbs from rolling into the way of the wheel when returning.

It will of course be understood that the construction which I have shown and described is subject to variation within reasonable limits without departing from the spirit of my invention.

I claim—

1. In a cultivator, the wheels journaled on separate axles, and the handle-bars, in combination with an adjustable arched bridge connecting the axles, and an adjustable cross-bar connecting the handle-bars, substantially as described.

2. The wheels journaled on separate axles, the side bars, handle-bars, and parts H' H² of the bridge attached to said axles, in combination with the adjustable platforms and adjustable cross-bar between the handles.

3. The separate axles, the side bars having slotted arms, and the handle-bars attached to said axles, and having bolts engaging the slotted arms, in combination with the adjustable bridge connecting the axles, and adjustable cross-bar connecting the handle-bars, whereby the handle-bars, side bars, and wheels may be adjusted toward or from each other, and the handle-bars may be raised or lowered to accommodate the height of the operator.

4. In a cultivator, platforms E, having transverse slots, in which the standards for the teeth or hoes are adjustably pivoted, in combination with side bars, to which the platforms are pivoted, and bolt O, which is rigid in one part, but passes through a slot in the other, and is tightened by a nut, whereby the platforms may be adjusted to regulate the depth to which the teeth enter the soil.

5. The handle-bars connected to the axles, in combination with parts H' H² of the bridge, which are bolted to the handle-bars, and bolts H⁶, which pass through slots in parts H' H², and hold them at any desired adjustment.

6. In a cultivator, the separate axles, platforms, and handle-bars, in combination with handle D, adjustably secured to the handle-bars, and bridge H, made in two parts, which also are adjustably connected together.

7. Plates G, having flanges G' and ears G², which are journaled on the axles, and the parts H' H² of the bridge having flanged plates H³, in combination with handle-bars C, and bolts I, which pass through both plates and the handle-bars.

8. The wheels, separate axles, side bars, and platforms, in combination with arms S, bolted to the platforms, and blades T, bolted to the arms, as and for the purpose set forth.

9. A blade, which lengthwise is curved downward, then upward, and crosswise is curved upward, then downward, in combination with the side bars, and platforms, and arms secured to the platforms, to which the blade is bolted, said arms being inclined backward, so that the front of the blade is considerably lower than the back thereof, as and for the purpose set forth.

10. Blade T and arms S, in combination with the platforms having slots F⁴, and bolts Q², which hold the arms at any desired lateral adjustment.

11. The platforms, arms S, and blade T, in combination with guards U, as and for the purpose set forth.

In testimony whereof I affix my signature in presence of two witnesses.

EVERETT C. ELLWOOD.

Witnesses:
J. T. WOOSTER,
WM. A. JONES.